United States Patent [19]

Toss

[11] Patent Number: 4,854,563

[45] Date of Patent: Aug. 8, 1989

[54] SUPPORT UNIT

[76] Inventor: Franco Toss, Hainstrasse 13, D-6305 Alten-Buseck, Fed. Rep. of Germany

[21] Appl. No.: 212,138

[22] Filed: Jun. 27, 1988

Related U.S. Application Data

[63] Continuation of Ser. No. 936,757, Dec. 2, 1986, abandoned.

[51] Int. Cl.[4] ..................... B23Q 3/08

[52] U.S. Cl. ..................... 269/25; 91/462; 92/171.1; 269/30

[58] Field of Search ..................... 269/25, 26, 30, 31, 269/289 R; 91/462; 92/163, 171

[56] References Cited

U.S. PATENT DOCUMENTS

| | | | |
|---|---|---|---|
| 254,741 | 3/1882 | Walsh | 269/25 |
| 965,807 | 7/1910 | Garvey | 269/25 |
| 1,865,434 | 7/1932 | Eggert | 269/25 |
| 2,403,427 | 7/1946 | Ludeman | 91/462 |
| 3,237,252 | 3/1966 | Ratcliffe | 269/25 |
| 3,632,102 | 1/1972 | Sessody | 269/25 |
| 3,727,772 | 4/1973 | Pauls | 269/25 |

FOREIGN PATENT DOCUMENTS 0134398 3/1985 European Pat. Off. .

*Primary Examiner*—Frederick R. Schmidt
*Assistant Examiner*—Judy J. Hartman
*Attorney, Agent, or Firm*—Larson and Taylor

[57] ABSTRACT

A movable carriage of a support unit is guided via bearing surfaces along a base. A double acting piston and cylinder unit is formed within a bore located in the base. A piston divides the cylinder into front and rear chambers and a piston rod thereof extends through the rear end of the cylinder and is connected to the carriage for movement therewith parallel thereto. A first pressure fluid connection extends through the front end of the cylinder into the front chamber. The bore has a sleeve, the outer surface of which partly defines a channel extending along the exterior of the cylinder. A second fluid pressure connection is also arranged at the front end of the cylinder, but it communicates with the channel to communicate with the rear cylinder chamber.

5 Claims, 1 Drawing Sheet

SUPPORT UNIT

This application is a continuation of application Ser. No. 936,757 filed Dec. 2, 1986, now abandoned.

The invention relates to a support unit for carrying e.g. a tool, a work piece or a measuring instrument.

Normally carriages are guided on bearing surfaces of a fixed frame and driven by a separate pressure fluid cylinder. It is also known to support and guide the carriage directly on the cylinder housing as base or frame. This leads to a very compact support unit with sliding carriage. However, especially in the latter case it is often difficult to connect both cylinder chambers of a double acting cylinder to a pressure fluid source and drain because often only the front end of the cylinder is freely accessible whereas its rear end is under the carriage and there are other machine parts hindering pressure fluid connection to the rear cylinder chamber.

Therefore, it is the object of the invention to provide a support unit which need only be accessible from the front side and which even in case of relatively long cylinders is simple and cheap in manufacture.

The new support unit comprises a movable carriage and a base with longitudinal bearing surfaces for guiding the carriage, the base being provided with a drive cylinder having a piston dividing the cylinder into a front and rear cylinder chamber, a piston rod leaving the cylinder at its rear end and being connected to the carriage and a first pressure fluid connection for the front cylinder chamber being arranged at the front end of the cylinder and this support unit is characterized in that a second pressure fluid connection for the rear cylinder chamber is arranged at the front end of the cylinder and that a sleeve inserted in the basewith its outer surface partly defines a pressure fluid channel extending from the second pressure fluid connection to the rear cylinder chamber.

Figure 1:
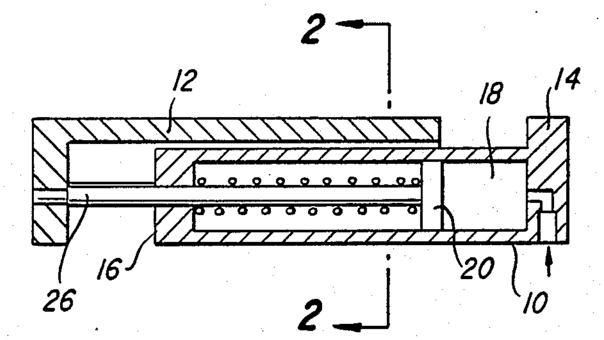
FIG. 1 is a schematic longitudinal sectional view through a support unit of the present invention.
Figure 2:
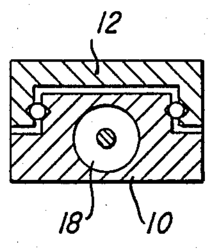
FIG. 2 is a cross-sectional view, taken along line 2—2 of FIG. 1.
Figure 3:
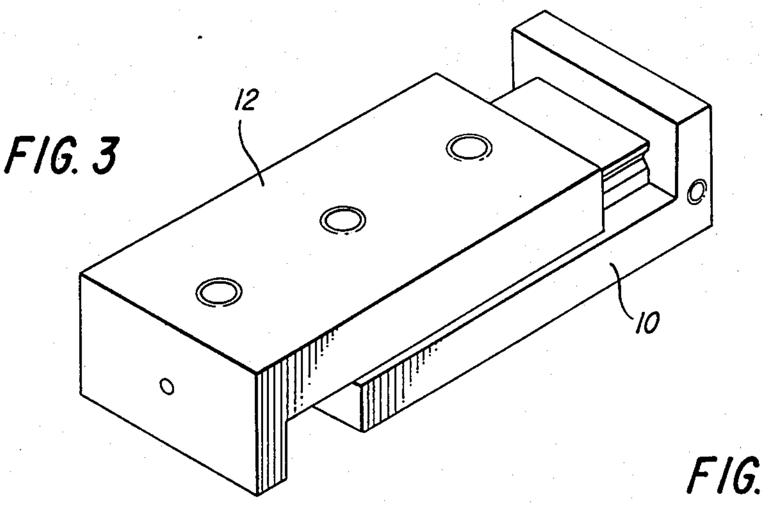
FIG. 3 is a perspective view of a support unit of FIGS. 1 and 2.

The support unit comprises a base 10 and a carriage 12 slidably mounted on base 10. Between the bearing surfaces of both parts may be arranged ball or roller bearings as shown in FIG. 2. The base 10 may screw bolts or other means (not shown) can be fixed to a table or a frame. A tool, a work piece or an instrument can be secured on top of the carriage 12.

The base 10 is a cylinder housing having a front end 14 and a rear end 16. A cylinder 18 extends from the front to the rear end. It cooperates with a piston 20 dividing the cylinder 18 in a front cylinder chamber 22 and a rear cylinder chamber 24. A piston rod 26 passes through the rear end wall of cylinder 18 and connects the piston 20 to the carriage 12.

The base has an interior portion which is bounded on its inside by a bore having a wall. Within the bore there is provided a sleeve or bushing 28 which is firmly inserted in the bore. On the inner side it defines cylinder 18 and is in contact with the piston 20, whereas on the outer side it confines a pressure fluid channel 30 which is manufactured as a longitudinal groove in the interior portion of the base 10. Channel 30 extends from a pressure fluid connection 32 at the front end 14 to a port 34 leading through sleeve 28 into rear cylinder chamber 24 at its rear end. Another pressure fluid connection 36 at the front end 14 leads into the front cylinder chamber 22.

Figure 6:
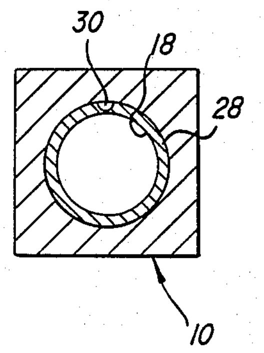
FIG. 6 is a cross-sectional view similar to FIG. 5 but showing a modification of the present invention.
Figure 5:
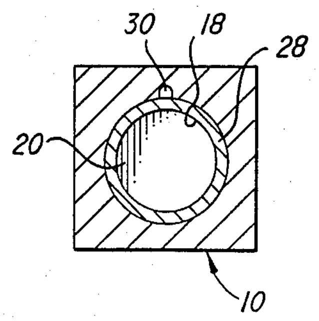
FIG. 5 is a cross-sectional view, taken along line 5—5 of FIG. 4.
Figure 4:
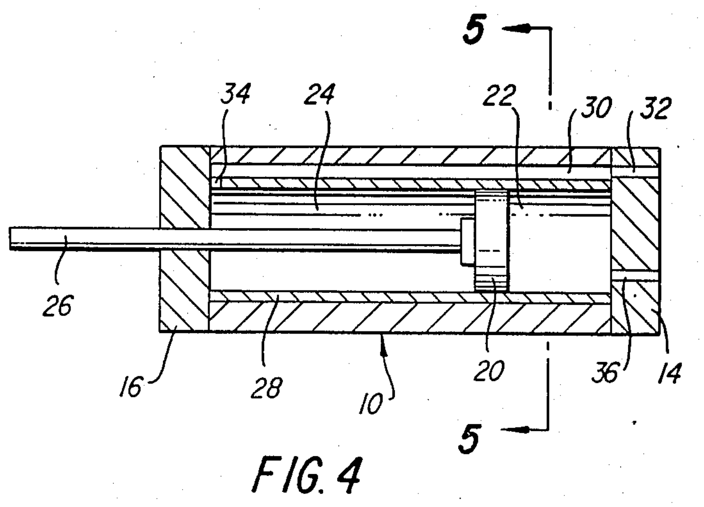
FIG. 4 is a cross-sectional view similar to FIG. 1, but showing only the cylinder of the support unit and on a greatly enlarged scale so as to show further details of the invention.

As shown in FIG. 6, channel 30 instead of being a groove in the interior portion of the base could be a groove in the outer wall of sleeve 28 or registering grooves in the opposed contacting surfaces of both parts. There could be more than one channel 30 between sleeve 28 and surrounding base part 10. The pressure fluid connections 32 and 36 could have outer openings at the front side or rear the front end at the bottom, upper surface or a side surface of the base.

I claim:

1. A support unit comprising a movable carriage and a base, said base having longitudinal bearing surfaces which guide the carriage thereon, said base having an interior portion, an inside surface of which defines a bore, a wall of which bore encloses a double acting drive cylinder therein, a piston dividing the cylinder into a front and a rear cylinder chamber, a piston rod extending through the cylinder at its rear end and being connected to the carriage such that the carriage moves along the base, with and parallel to the rod,
   - a first pressure fluid connection for the front cylinder chamber, which connection is arranged at the front end of the cylinder, and a second pressure fluid connection for the rear cylinder chamber, said second pressure fluid connection also being arranged at the front end of the cylinder,
   - a sleeve located in the bore, the sleeve being a separate element from the said interior portion, a pressure fluid channel extending from the second pressure fluid connection to the rear cylinder chamber, said sleeve being cylindrical and lining the bore substantially completely in contact with said wall to define the inside of the cylinder, and said pressure fluid channel being formed as a longitudinal groove, said groove being defined by a longitudinally extending space of enlarged cross-section bounded in part by the sleeve and in part by the said interior portion of the base, the enlarged cross-section being formed into at least one of said bore wall or said sleeve.

2. A support unit according to claim 1, wherein the enlarged cross-section is formed, at least in part, by a longitudinal cut into the bore wall.

3. A support unit according to claim 2, wherein the enlarged cross-section is formed completely by a cut into the bore wall, an outer surface of the sleeve adjacent the groove being cylindrical.

4. A support unit according to claim 1, wherein the enlarged cross-section is formed at least in part by a cut into the outer surface of the sleeve.

5. A support unit according to claim 4, wherein the enlarged cross section is formed completely by a cut into the sleeve, an outer surface of the bore wall adjacent the groove being cylindrical.

* * * * *